3,543,387
METHOD FOR THE EXPLOSIVE WELDING OF A METAL PLUG TO A METAL TUBE OR OF NESTED PORTIONS OF METAL TUBES TO EACH OTHER
Paolo Golinelli, Modena, Helmut Holtbecker, Cardana di Besozzo, and Mario Montagnani, Bologna, Italy, Joost Louis Remmerswaal, Voorburg, Netherlands, and Guido Verzeletti, Ispra, Italy, assignors to European Atomic Energy Community (EURATOM), Brussels, Belgium
Filed Nov. 8, 1968, Ser. No. 774,459
Claims priority, application Germany, Dec. 1, 1967, 1,627,503
Int. Cl. B21d *39/04*
U.S. Cl. 29—474.3
11 Claims

ABSTRACT OF THE DISCLOSURE

A method of explosively welding two telescopically fitted members by using a laminar explosive charge and a deformable buffer ring. An annular gap is left between the members permitting conversion of shock wave energy to impact work and the explosive charge is externally placed around the buffer ring and detonated at a plurality of points.

---

Figure 1:
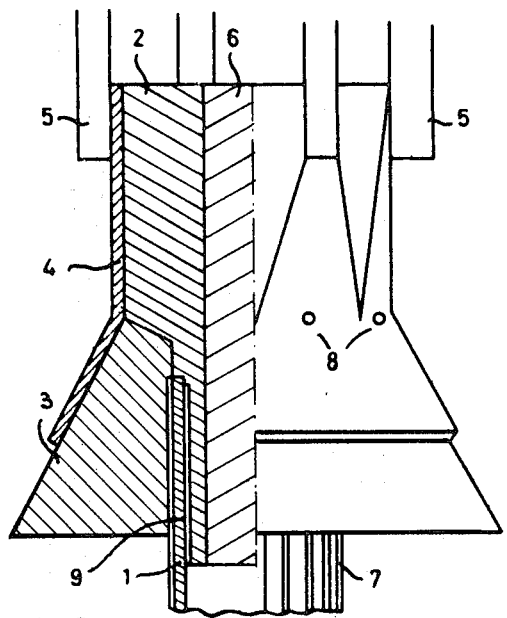

The invention relates to a method for the explosive welding of a metal plug to a metal tube, for example a nuclear fuel element tube to its sealing plug, or of nested portions of metal tubes to each other, for example of a reactor pressure tube to its terminating tubes, and relates in particular to the preparation of the welding structure.

Explosive welding methods were hitherto developed only for joining materials for which conventional welding methods could not be employed at all or became too expensive. These materials include in particular sintered metals but also numerous metals, alloys and dispersion alloys (for example SAP, niobium, Zirkalloy). The last-mentioned materials are used in particular in nuclear engineering.

The methods employed hitherto for the explosive welding of the afore-mentioned materials do not however provide satisfactory results as regards reproducibility of the weld or, where welding is successful, they involve structural damage of the weld material.

In the welding of fuel element tubes with their plugs or of reactor pressure tubes with their connecting sleeves there are a number of further requirements in addition to the stringent requirements made on the quality of the weld and on the weld material, particularly requirements relating to the dimensional and form stability of the weld material. This applies to a marked degree to externally finned fuel tubes in which the fins must not be deformed by the explosive welding.

None of the explosive welding methods proposed earlier (see the Report issued by the Battelle Memorial Institute, BMI–1594, pages 82 et seq.) satisfies the aforementioned requirements and the tests (published in the Euratom Report EUR 1818 *i*) preceding the present invention initially remained unsatisfactory.

Further research of the parameters governing the welding operation and relating to structure material and operation, also a study of the propagation of shock waves and the manner in which they can be influenced finally led to the development of a method of welding and a welding structure which ensures a reliable, reproducible weld and is suitable for the welding together of materials which are difficult to weld and for the welding of such materials to other materials.

The invention provides a method for the explosive welding of a plug to a tube or of tubes to each other by using a laminar explosive charge and a deformable buffer ring for transmitting the shock wave to the weld material, characterised in that the components to be joined to each other are telescoped into each other in the weld zone region while leaving an annular gap sufficient for the conversion of the shock wave energy into impact work, that in the weld zone the buffer ring is applied in engagement with the outer wall of the outer component, that the explosive charge is placed externally around the buffer ring, said charge being connected at a plurality of points along the circumference thereof to fuse lines and that the charge is simultaneously detonated at all connecting points.

This method ensures that the explosion produces a welding front which progresses substantially uniformly over the entire weld zone, the velocity of said weld front being less than that of sonic velocity. This is one of the principal conditions discovered to be necessary for reliable welding. Under these conditions the weld surfaces intermesh in an eddy pattern which is however of homogeneous structure while there is no destruction in the weld material.

In the case of a tube-plug joint, the resultant implosion pressure is absorbed by the plug itself. It will be evident that in the case of a tube-to-tube joint a suitable pressure-absorbing block should appropriately be inserted in the internal tube in the weld zone region.

The necessary reduction of weld velocity below the velocity of the shock wave is obtained or improved individually or in combination by the following measures.

(1) By a gradual increase in the thickness of the buffer ring in the direction away from the fuse-line connecting points (i.e. in the direction of travel of the weld front) and by suitable selection of the taper angle of the buffer ring between 15° and 60°, preferably 30°;

(2) By the choice of an explosive material which burns slowly;

(3) By slight displacement of the buffer ring, if it is of cylindrical shape, upwardly towards the weld zone, that is to say in the direction of the fuse line connections, and (4) By the slightly tapered construction of the annular gap between the components to be welded together.

Welding is appropriately performed in an oxygen-free atmosphere for example in vacuum, in order to avoid local burning of the welding material in special cases.

In order furthermore to ensure that the shock wave front advancing over the tube circumference of the components in their axial direction shall be as rectilinear as possible, the explosive film is constructed in zig-zag form on the connecting side of the fuse lines while recesses or apertures are provided in the zone of the serration roots in the centre of each serration area also at the apex of the serration fillets. The effective burning cross-section of the film in this zone should appropriately be reduced by between 10% and 50% relative to the unperforated zone.

It is finally advantageous to employ strips of fuse film as fuse line. The term fuse film also applies to explosive films of several millimetres thickness.

Figure 3:
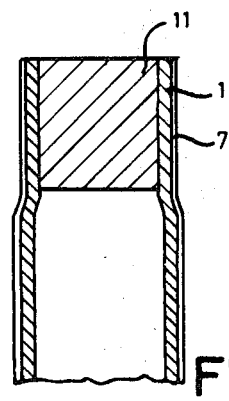
Figure 2:
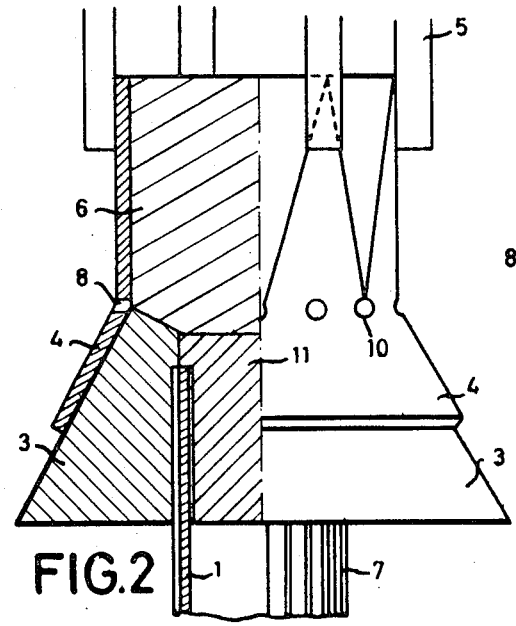
Figure 4:
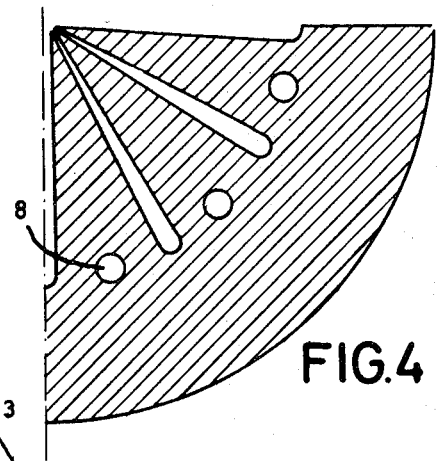

Two specific embodiments of the invention as applied to finned tubes will now be described by way of example and with reference to the accompanying drawings in which:

FIG. 1 is a side elevation of a telescopic tube-to-tube joint prepared for welding, the left half being axially sectioned, FIG. 2 is a tube-plug joint prepared for welding, the left half being axially sectioned, FIG. 3 is a longitudinal section of the joint according to FIG. 2 after welding; and FIG. 4 is a plan view of a sectioned sector of the welding film employed in the assembly illustrated in FIG. 2.

In FIG. 1, the numeral 1 refers to an externally finned tube, the numeral 2 refers to a connecting tube to be welded to the tube 1, the numeral 3 refers to a tapered buffer ring for transmitting the shock wave, the numeral 4 refers to an explosive film, the numeral 5 to fuse lines and the numeral 6 to a pressure-absorbing block. The tube fins 7 and perforations 8 of the film are disclosed on the right-hand side of the figures.

An annular gap 9, easily obtained by machining of the tube 2, is left between the tubes 1 and 2. The width of the annular gap for the tube diameters under consideration may be between 0.2 and 2 mm. The gap ensures that when the explosion occurs the end portion of the tube 1 acquires kinetic energy towards the tube 2, and derived from the energy of the shock wave, the kinetic energy being subsequently destroyed by impact between the tubes.

The resilient buffer ring 3 is shaped to provide engagement with the fins 7, and is fitted around the outer tube 1. Said buffer ring has a tapered external surface and extends over the weld zone, except at the bottom thereof.

The explosive film 4 is placed in contact around the ring, and has serrations to the tips of which the fuse lines 5 are adhesively attached. The explosive film is so placed around the buffer ring 3, that the bases of the serrations are positioned in the angle at the upper end of the ring.

Above the components shown all the fuse lines are assembled coaxially to each other and are connected to an electric fuse so that all film ends or serrations of the explosive film are fired in synchronism. The explosive shock wave will then extend annularly from the ends downwardly into the buffer ring and from there to the surface of the tube 1. The welding wave produced by the impacting parts of the tube will then travel in the same direction through the welding zone but at a velocity which is less than the sonic velocity.

The structure of the weld shown in FIG. 2 conforms to the same principle, identical reference symbols being used for parts analagous to those of FIG. 1. In this case further recesses 10 are provided in the explosive film in addition to the pressure-distribution apertures 8 disposed in the centre of each serration and furthermore the film also emcompasses the pressure-absorption member 6 above the plug 11.

After welding of the tube-plug joint, the excess upper part of the tube together with its corresponding plug part is cut off. As shown in FIG. 3, the cross-section is slightly reduced in the plug zone but without deforming the tube fins.

As indicated in FIG. 4, the shape of the film may be easily produced by blanking of a film stack and can be accurately adapted to the taper angle of the buffer ring. The progress of the shock wave can therefore be accurately predetermined so that the welding operation is rendered substantially independent of random effects.

The welding method according to the invention has been successfully employed for welding components comprising the following pairs of materials: SAP-SAP, steel-Zircalloy; Zirkalloy-Zirkalloy; SAP-steel; and steel-steel.

The commercial plastics explosive known under the name "Pentritt" was used as explosive material with a film thickness of 2 mm. The detonation velocity of this explosive material is approximately 7.5 km./s. The fuse lines employed were approximately 15 cm. long, were made of the same explosive material and each contained approximately 7 g./m. explosive material.

A mixture comprising 100 parts by weight of polyvinyl chloride, 130 parts by weight of dioctylphthalate (DOP) and 4 parts by weight of dibutyl stannous maleate were used as material for the buffer ring. The compound was initially degassed, heated for 2 hours to a temperature of 170° C. and finally moulded to the desired shape. Other materials having a rubber-like characteristic may also be employed and chosen to vary the extent to which the welding velocity is controlled by the buffer ring.

We claim:
1. Method for the explosive welding of a plug to a tube or of tubes to each other by using a laminar explosive charge and a deformable buffer ring for transmitting the shock wave to the weld material, characterised in that the components to be joined to each other are telescoped into each other in the weld zone region while leaving an annular gap sufficient for the conversion of the shock wave energy into impact work, that in the weld zone the buffer ring is applied in engagement with the outer wall of the outer component, that the explosive charge is placed externally around the buffer ring, said charge being connected at a plurality of points along the circumference thereof to fuse lines and that the charge is simultaneously detonated at all connecting points.

2. A method of welding as claimed in claim 1 in which the buffer ring is of increasing thickness in the direction away from the fuse-line connecting points.

3. A method of welding as claimed in claim 2 in which the buffer ring increases in thickness with a taper angle of between 15° and 60°.

4. A method as claimed in claim 3 in which the angle is, substantially, 30°.

5. A method as claimed in claim 1 in which the fuse-line connecting points are equidistant around the explosive charge.

6. A method as claimed in claim 1 in which the explosive charge is in the form of a slowly burning film.

7. A method as claimed in claim 1 in which the explosive charge is of serrated form around its periphery at one edge and the fuse-lines are connected to the apices of the serrations.

8. A method as claimed in claim 7 in which the charge is cut away both centrally at the base of each serration and between pairs of adjacent serrations, to reduce locally the effective burning circumferential cross-section of the charge.

9. A method as claimed in claim 8 in which the cross-section reduction is between 10 and 50%.

10. A method as claimed in claim 1 in which the welding operation is carried out with exclusion of oxygen.

11. A method as claimed in claim 3 in which the explosion produces a welding front which travels over the weld zone with a velocity less than that of sound.

References Cited

UNITED STATES PATENTS

| | | |
|---|---|---|
| 3,036,374 | 5/1962 | Williams. |
| 3,140,537 | 7/1964 | Popoff _____ 29—474.3 |
| 3,238,753 | 3/1966 | Benatac et al. |
| 3,263,323 | 8/1966 | Maher et al. _____ 29—421 XR |
| 3,364,561 | 1/1968 | Barrington _____ 29—474.3 XR |
| 3,434,194 | 3/1969 | Whittaker et al. |
| 3,455,017 | 7/1969 | Zondag. |
| 3,491,798 | 1/1970 | Bushard. |

JOHN F. CAMPBELL, Primary Examiner

R. B. LAZARUS, Assistant Examiner

U.S. Cl. X.R,
29—421, 470.1